3,561,005
PROCESS FOR THE PRODUCTION OF 2,4-DICHLOROPYRIMIDINE - 5-CARBOXYLIC ACID CHLORIDE
Tibor Somlo and Alain Claude Rochat, Birsfelden, near Basel, Switzerland, assignors to J. R. Geigy A.G., Basel, Switzerland
No Drawing. Filed Sept. 10, 1968, Ser. No. 758,690
Claims priority, application Switzerland, Sept. 20, 1967, 13,165/67
Int. Cl. C07d 51/36
U.S. Cl. 260—251
7 Claims

ABSTRACT OF THE DISCLOSURE

Process for producing 2,4-dichloropyrimidine-5-carboxylic acid chloride by reacting uracil-5-carboxylic acid with a chlorinating agent which may be either phosphorous trichloride and chlorine or phosphorous pentachloride in a reaction medium containing phosphorus oxychloride, the objective compound being recovered in yields above 90% of the theoretical value. The 2,4-dichloropyrimidine-5-carboxylic acid chloride so obtained is sufficiently pure so that it can be further used as acylating agent, e.g. for the production of reactive dyestuffs.

---

The invention concerns a new process for the production of 2,4-dichloropyrimidine-5-carboxylic-acid-chloride from uracil-5-carboxylic acid (2,4-dihydroxypyrimidine-5-carboxylic acid).

Several processes have already been suggested for the chlorination of hydroxypyrimidine carboxylic acids. These, however, involve several steps and produce unsatisfactory low yields. For example, it is known to react uracil-5-carboxylic acid in a first step with phosphorus oxychloride, optionally in the presence of catalysts such as tertiary amines to form 2,4-dichloropyrimidine-5-carboxylic acid and then to convert the latter into the acid chloride by treatment with thionyl chloride.

Also, the use of phosphorus pentachloride and phosphorus oxychloride for the production of 2,4-dichloropyrimidine-6-carboxylic acid chloride by chlorination of orotic acid (uracil-6-carboxylic acid), is known.

However, this process which involves the conversion of the preponderantly non aromatic uracil nucleus to the practically purely aromatic pyrimidine nucleus, affords only yield rates of the acid chloride of at best 64% calculated on uracil-6-carboxylic acid starting material. For, in this process, a large amount of byproducts is formed which are very difficult to separate from the desired pyrimidine derivative.

Unexpectedly, and contrary to the above results obtained when chlorinating uracil-6-carboxylic acid, the analogous chlorination of uracil-5-carboxylic acid leads to a conversion of the latter to the practically purely aromatic 2,4-dichloropyrimidine-5-carboxylic acid chloride in very high yields, above 90% and usually of about 96 to 99%.

Analogously to the results of the chlorination of the isomeric uracil-6-carboxylic acid (orotic acid) the formation of considerable amounts of byproducts, in the present case, particularly substitution or addition products, such as higher chlorinated pyrimidine-5-carboxylic acid chloride derivatives having more than three chlorine atoms as ring substituents, would have been expected to mask the desired course of the reaction.

The process according to the invention, therefore, provides for the production of 2,4-dichloropyrimidine-5-carboxylic acid chloride in the aforesaid high yields and purity, in a very economical manner and in a simple process step, by refluxing free uracil-5-carboxylic acid in phosphorus oxychloride as the reaction medium with a chlorinating agent selected from phosphorus trichloride and chlorine, or phosphorus pentachloride, the molar ratio of the chlorinating agent to uracil-5-carboxylic acid being advantageously about 3:1, any excess of the chlorinating agent not exceeding 10% by weight of the stoichiometrically required amount thereof.

With the preferred use of phosphorus trichloride and preferably gaseous chlorine as chlorinating agent, the progress of the reaction is as follows:

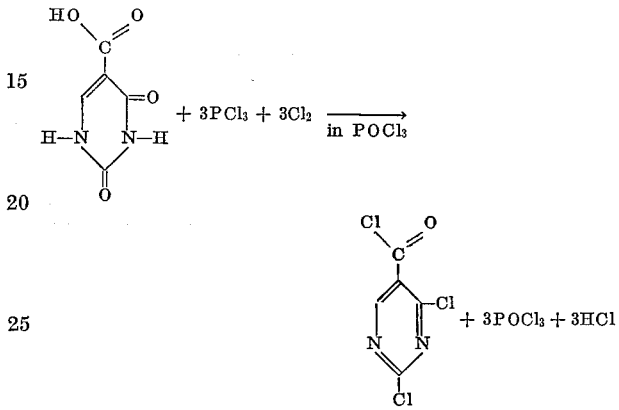

or with the use of phosphorus pentachloride the progress of the reaction is:

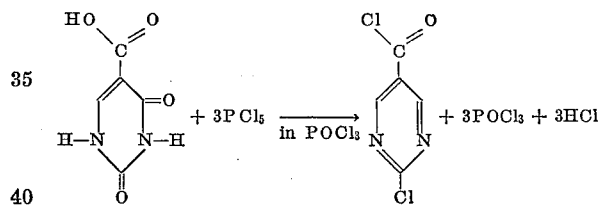

The chlorination is advantageously performed by introducing gaseous or liquid chlorine into a suspension of uracil-5-carboxylic acid in a mixture of phosphorus trichloride and phosphorus oxychloride. The chlorine can optionally be introduced in the form of a solution in a suitable liquid vehicle, e.g. in a solvent such as dichlorobenzene, trichlorobenzene or tetrachlorobenzene, which is itself inert in the above-described reaction. The rate at which the chlorine is introduced is, apparently, not too critical. However, the amount of chlorine used should not be more than the stoichiometric amount required for the chlorination according to the above equation, mode (a). The total amount of chlorinating agent is in the mode of operation (a) or (b) in the above equation and should not be more than about 10% by weight above the stoichiometrically required amount. A considerably smaller excess is preferred. During the chlorination, the reaction mixture, advantageously, should be stirred and heated under reflux. The reaction temperature is dependent on the boiling point of the reaction mixture and lies between 50 to 150° C., and in the preferred mode of operation it rises gradually from about 75 to about 115° C. and toward completion of the reaction in the vicinity of 115° C.

The phosphorus oxychloride can be removed from the final reaction mixture obtained in a conventional manner, e.g. by evaporation. In the process according to the invention, a crude product is obtained which is sufficiently pure so that it can be further used as acylating agent for many different purposes, e.g. for the production of reactive dyestuffs.

Further details can be seen from the following nonlimiting examples, in which the temperatures are given in degrees centigrade, and all percentages are by weight.

EXAMPLE 1

62.4 g. of uracil-5-carboxylic acid (M.P. 376–378° with decomposition) are added to a mixture of 77 g. of phosphorus oxychloride and 182 g. of phosphorus trichloride. The mixture is brought to the boil (about 79°) whereupon 94 g. of gaseous chlorine are introduced into the reaction mixture within 2 hours, the reaction mixture being kept under reflux (79–114°). The phosphorus oxychloride is then distilled off whereupon 84 g. (98% of the theoretical) of 2,4-dichloropyrimidine-5-carboxylic acid chloride remain in the flask as a brown-yellow viscous liquid. The product (B.P.$_{.12\ mm.}$ 130°) is sufficiently pure for most purposes. Degree of purity 96–98%. Refraction index: $n_D^{20} = 1.5932$.

If, instead of uracil-5-carboxylic acid, the same amounts of uracil-6-carboxylic acid are used with otherwise the same procedure as given in Example 1, then only 31.3 g. (37% of the theoretical) of 2,4-dichloropyrimidine-6-carboxylic acid chloride are obtained.

EXAMPLE 2

62.4 g. of uracil-5-carboxylic acid (M.P. 376–378° with decomposition) are added to a mixture of 150 g. of phosphorus oxychloride and 276 g. of phosphate pentachloride. The mixture is heated to reflux (114° C.) and refluxed for 4 hours. The phosphorus oxychloride is then distilled off whereupon 84 g. of 2,4-dichloropyrimidine-5-carboxylic acid chloride remain in the flask as a brown-yellow, viscous liquid. The crude product (B.P.$_{.12\ mm.}$ 130°) is sufficiently pure for most purposes. Content: 96–98%. Refraction index: $n_D^{20} = 1.5932$.

EXAMPLE 3

62.4 g. of uracil-5-carboxylic acid are suspended in 100 g. of o-dichlorobenzene. 50 g. of phosphorus oxychloride and 182 g. of phosphorus trichloride are added to this suspension and the mixture is brought to the boil (about 80°). While maintaining reflux temperature (80–114° C.), 94 g. of gaseous chlorine are introduced and the mixture is further heated until a solution is formed. The phosphorus oxychloride and o-dichlorobenzene are then distilled off whereupon 84 g. (98% of the theoretical) of 2,4-dichloropyrimidine-5-carboxylic acid chloride remain in the flask in the form of a brown-yellow viscous liquid. The product boils at 130° C. under 12 mm. Hg and is sufficiently pure for most purposes. Degree of purity 96–98%. Refraction index: $n_D^{20} = 1.5932$. Due to its great purity, the product can be distilled under vacuum without decomposition.

If instead of the 94 g. of gaseous chlorine, the same amounts of liquid chlorine are used with otherwise the procedure given in the example, a similarly good yield of 2,4-dichloropyrimidine-5-carboxylic acid chlorine is obtained.

EXAMPLE 4

62.4 g. of uracil-5-carboxylic acid are added to a mixture of 150 g. of phosphorus oxychloride and 182 g. of phosphorus trichloride. 94 g. of liquid chlorine are introduced under pressure into this mixture while stirring and then the reaction mixture is refluxed (about 100° C.) until a solution is obtained. This takes about 4 hours. The phosphorus oxychloride is then distilled off whereupon 84 g. (98% of the theoretical) of 2,4-dichloropyrimidine-5-carboxylic acid chloride remain in the flask as a brown-yellow viscous liquid. The product boils at 130° C. under 12 mm. Hg and is sufficiently pure for most purposes. Degree of purity: 96–98%. Refraction index: $n_D^{20} = 1.5932$.

We claim:

1. A process for the production of 2,4-dichloropyrimidine-5-carboxylic acid chloride comprising refluxing and thereby reacting a mixture of 1 mol of uracil-5-carboxylic acid and a chlorinating agent, the molar ratio of the chlorinating agent to uracil-5-carboxylic acid being about 3:1, any excess of the chlorinating agent not exceeding 10% by weight of the stoichiometrically required amount thereof, selected from (a) phosphorus trichloride and chlorine, and
(b) phosphorus pentachloride, in a reaction medium consisting essentially of phosphorus oxychloride, thereby obtaining a reaction product more than 90% by weight of the theory which consists of 2,4-dichloropyrimidine-5-carboxylic acid chloride and separating the reaction product from the reaction medium.

2. A process as defined in claim 1, wherein said chlorinating agent is the agent defined under (a), and wherein the amount of chlorine does not exceed the stoichiometrically amount thereof required for reaction with the amount of uracil-5-carboxylic acid present therein.

3. A process as defined in claim 2, wherein gaseous chlorine is introduced into a mixture of uracil-5-carboxylic acid and phosphorus trichloride in phosphorus oxychloride.

4. A process as defined in claim 1, wherein uracil-5-carboxylic acid is added to a mixture of phosphorus pentachloride and phosphorus oxychloride.

5. A process as defined in claim 1, wherein the reaction product is separated from the phosphorus oxychloride reaction medium by evaporating the latter.

6. A process as defined in claim 2, wherein chlorine is introduced into the reaction dissolved in a solvent therefr which is inert in the ensuing reactin.

7. A process as defined in claim 6, wherein said inert solvent is di-, tri- or tetrachlorobenzene.

References Cited

UNITED STATES PATENTS 3,433,781  3/1969  Ackermann et al. ____ 260—146

OTHER REFERENCES

C. A. 58, 1570 h (1963), Ciba.
Morrison et al.: "Organic Chemistry," 1959, Allyn & Bacon, pp. 455–6.

ALEX MAZEL, Primary Examiner
R. V. RUSH, Assistant Examiner